United States Patent

Ikemoto et al.

[11] Patent Number: 6,114,033
[45] Date of Patent: *Sep. 5, 2000

[54] CEMENT RETARDER AND CEMENT RETARDATIVE SHEET

[75] Inventors: Yoshiyuki Ikemoto, Yokohama; Toru Ikuta, Kobe, both of Japan

[73] Assignee: Daicel-Huels Ltd., Tokyo, Japan

[*] Notice: This patent is subject to a terminal disclaimer.

[21] Appl. No.: 09/219,347

[22] Filed: Dec. 23, 1998

Related U.S. Application Data

[62] Division of application No. 08/718,384, filed as application No. PCT/JP96/00252, Feb. 7, 1996, Pat. No. 5,932,344.

[30] Foreign Application Priority Data

Feb. 7, 1995 [JP] Japan ............................ 7-42373
Oct. 30, 1995 [JP] Japan ........................... 7-305132

[51] Int. Cl.[7] .................... B32B 27/04; B32B 27/06; B32B 27/36
[52] U.S. Cl. .................. 428/343; 428/355 R; 428/480; 428/703; 528/302; 528/308; 528/308.6; 528/308.7; 264/299; 264/337; 264/338
[58] Field of Search .................. 428/343, 480, 428/703, 355 R; 528/302, 303, 304, 306, 308.6, 308.7; 525/437, 445, 477, 448, 452; 523/500, 515; 264/299, 337, 338

[56] References Cited

U.S. PATENT DOCUMENTS

| | | | |
|---|---|---|---|
| 4,050,943 | 9/1977 | Sondhe | 106/12 |
| 4,115,336 | 9/1978 | Crouzet | 260/29.6 R |
| 5,236,975 | 8/1993 | Sekine | 523/510 |

FOREIGN PATENT DOCUMENTS

| | | |
|---|---|---|
| 0223592 | 5/1987 | European Pat. Off. . |
| 0401051 | 12/1990 | European Pat. Off. . |
| 2273677 | 1/1976 | France . |
| 1057069 | 10/1983 | Japan . |
| 61-202803 | 8/1986 | Japan . |
| 63-216703 | 9/1988 | Japan . |
| 1172250 | 7/1989 | Japan . |
| 58-166006 | 12/1989 | Japan . |
| 1775003 | 7/1991 | Japan . |
| 3224953 | 10/1991 | Japan . |
| 4062107 | 2/1992 | Japan . |
| 538711 | 2/1993 | Japan . |
| 550411 | 3/1993 | Japan . |

*Primary Examiner*—Vivian Chen
*Attorney, Agent, or Firm*—Birch, Stewart, Kolasch & Birch, LLP

[57] ABSTRACT

A saturated polyester obtained by a reaction of a polycarboxylic acid component comprising a polycarboxylic acid having 2 to 6 carbon atoms in the main chain (e.g. maleic anhydride), and a polyol component comprising a polyhydric alcohol having 2 to 4 carbon atoms or its condensate is used as a cement retarder. A retardative sheet can be formed by applying or impregnating a composition comprising the retarder and a tacky adhesive to a base sheet. By forming a predetermined pattern with the use of the retarder or sheet in a form, depositing a mortar composition, washing a surface of the hardened concrete, and washing out uncured mortar, a figure or a washing finished surface is formed on a surface of a concrete product.

19 Claims, No Drawings

CEMENT RETARDER AND CEMENT RETARDATIVE SHEET

This application is a divisional of application Ser. No. 08/718,384, filed Oct. 7, 1996, U.S. Pat. No. 5,932,344, which is a 371 of PCT International Application No. PCT/JP96/00252, filed on Feb. 7, 1996, the entire contents of each of the above identified applications are hereby incorporated by reference.

TECHNICAL FIELD

This invention relates to a cement retarder (cement hardening-retarder) which is useful for retardation of hardening of the surface of a hardenable or curable composition comprising cement, a cement retardative sheet as produced using the retarder, and their use.

BACKGROUND TECHNOLOGY

A cement retarder is categorized into a cement admixture (a cement additive) which is admixed with cement for the purpose of retardation of setting and hardening of mortar or concrete by means of retarding hydration of cement. With respect to a cement retarder, Japanese Patent Application Laid-open No. 172250/1989 (JP-A-1-172250) mentions lead oxide, boron oxide, borax, zinc chloride, zinc oxide, magnesium silicofluoride and other inorganic retarders, polyhydroxy compounds (sugar, an alcohol, methyl cellulose, ethyl cellulose, poly(vinyl alcohol), dextrin, etc.), poly(sodium acrylate), a hydroxycarboxylate, a lignosulfonate, gluconic acid or its salt, pyruvic acid, α-ketoglutaric acid or other keto acids, and other organic retarders. The purpose of the use of these cement retarders is to transport a ready-mixed concrete over a long period with suppressing hardening of the concrete in summer, and to mitigate a stress due to a temperature (heat) in a large-sized concrete structure.

The surfaces of molded articles and various buildings made from concrete are practically decorated with the use of aggregate exposed finish by washing (washing finish) technology which is categorized into plastering technologies. The washing finish technology is a technology for exposing a part of aggregate by washing immediately before hardening of the concrete and hence washing out mortar of the surface layer of the concrete. According to this technology, the washing should be conducted in an extremely limited period (timing) since opportunity for washing closely relates to the hardening rate (cure rate) of the concrete. Therefore, the technology is unsuitable for commercial production or large-sized building applications.

With respect to execution of tile works to a surface of concrete, a technology using a unit tile as produced by disposing and adhering plural of tiles on a surface of a tacky adhesive layer of a tacky adhesive tape has been proposed. According to this technology using the unit tile, tiles are applied by disposing the unit tile in a form or shuttering to which concrete is placed or deposited, pouring mortar into the form and curing the same, removing the hardened product from the form and taking off the adhesive sheet to expose the tiles on the surface of the concrete, and thereafter removing the cement reached and cured on the surfaces of the tiles to conduct surface finish. In the surface finish, the cured cement adhered to the tiles may practically be scraped by hand and this is an essential step for tile application (tile work) which is characterized in a beautiful and tiny surface. The work for removing the hardened cement adhered to tiles, however, takes much time and trouble and is complicated so that the cost for tile application increases and the removing treatment for hardened cement would cause damage or defect of surfaces of the tiles.

For the purpose of solving these problems, technologies have been proposed, which technologies comprise processing a surface of a concrete product or forming a pattern on the surface by inhibition of hardening of only the surface layer but no other part of the concrete with the application of a cement retarder which is categorized into cement additives. By way of illustration, a process has been proposed, which process comprises impregnating a retarder (hardening retarder) in paper, fixing the impregnated paper on the bottom of a form by means of applying or posting, depositing mortar into the form, and after hardening of the concrete, removing the concrete molded article from the form, and washing fresh mortar on the surface of the concrete which is in contact with the impregnated paper to expose aggregate and hence to obtain a natural feeling. Japanese Patent Application Laid-open No. 216703/1988 (JP-A-63-216703) discloses a process for forming a predetermined convex-concave pattern (three-dimensional pattern) on a surface of a concrete product, which process comprises a step of cutting a pattern paper as produced by impregnating a retarder into a paper to produce a cutting pattern paper corresponding to a predetermined letter or figure or other pattern, a step of applying the cutting pattern paper to a predetermined part of the inner surface of a form, a step of depositing mortar into the form and curing the mortar, a step of breaking up the form to take the resultant concrete product off and a step of washing a part of the concrete product corresponding to the pattern paper. Japanese Patent Application Laid-open No. 202803/1986 (JP-A-61-202803) discloses a process which comprises applying tiles or others to a paper coated with the above-mentioned cement retarder, setting or placing the tile-applied paper into a form and washing out the product in the same manner as above.

Japanese Patent Application Laid-open Nos. 38711/1993 (JP-A-5-38711) and 50411/1993 (JP-A-5-50411) disclose a process which comprises applying a mixture containing an ultra-retarder, a tackifier, an extender or filler and a white pigment to an inner surface of a form, depositing mortar or concrete into the form, hardening the mortar or concrete and taking off the cured product from the form, washing cement paste from the surface of the cement product which is in contact with the form to finish the surface of the cement product.

However, a conventional retarder which inhibits hydration mechanism of cement has high solubility with respect to water, and hence is dissolved in water or moisture in a cement concrete. Therefore, the retarder dissolves accompanied with placement of mortar or concrete, and flows in the form or the surface of a molded article or structure together with an excessive bleed water in the mortar or concrete. Accordingly, the retarder may flow into a portion where washing finish is not required or it may concentrate locally, and, to the contrary, the retarder may flow out from a portion where washing finish or decorating is required. Further, the depth of washing is particularly increased in a surface where bleeding water has passed through. Therefore, a decorative letter or figure, in particular a complicated decoration or ornament, can hardly be formed with high accuracy in a predetermined part of a surface of a concrete molded article or concrete building.

Japanese Patent Application Laid-open No. 224953/1991 (JP-A-3-224953) discloses a process for manufacturing a concrete block integrated with an ornament material (decorative material), which process comprises applying a concrete-hardening inhibitor (concrete non-hardener) to an inner surface of a form (shuttering), disposing an ornament such as a tile or stone through a joint rod, composing a reinforcing steel (reinforcement) up to a predetermined height, depositing concrete and hardening the concrete, removing the hardened concrete from the form, and washing the surface of the resultant concrete product with water. This literature discloses that the concrete non-harder is incorporated into a composition comprising an alkali swelling agent, a highly-water-absorbable polymer, a water-absorbable monomer and a curing agent to cure the composition, and thereby a highly-water-absorbable polymer-containing cured film is obtained.

Japanese Patent Application Laid-open No. 175003/1991 (JP-A-3-175003) discloses a process for manufacturing a concrete product decorated in a surface thereof, which process comprises temporally adhering a decorative member, through an non-cured coating layer, to an inner surface of a form (mold), depositing or placing concrete to harden the concrete, and thereafter removing the hardened product from the form, and taking off the non-cured coating composition on the surface and uncured portion of concrete of the resultant concrete product by washing with water. This literature mentions that the non-cured coating layer is produced with the use of a mixture of a polyester, poly(vinyl alcohol), poly(vinyl acetal) or other alkali swelling agents, and a highly-water-absorbable polymer.

According to the technologies described in these literatures, the place of ornament disposed in the form is sifted or the concrete non-curing agent flows out so that washing finished surface or pattern can hardly be formed in a predetermined portion of a concrete product. Further, since it is necessary to apply the non-curing coating composition to the surface of an ornament, improved workability and productivity of the concrete product would not be expected. Incidentally, Japanese Patent Application Laid-open No. 175003/1991 (JP-A-3-175003) mentions that the concrete non-curing agent may be in the sheet form. However, the concrete non-curing agent is composed of a mixture of the alkali swelling agent and highly-water-absorbable polymer so that the agent can hardly be molded into a sheet. Furthermore, a highly-water-absorbable polymer is required in addition to the alkali swelling agent in order to retard hardening (curing) of cement, and there is no detail disclosure concerning the polyester described as an example of the alkali swelling agent.

It is, therefore, an object of the present invention to provide a cement retarder having a high inhibiting property with respect to hardening of cement, despite its poor solubility in water.

It is another object of the invention to provide a cement retarder which is useful for inhibiting flow out of the retarder due to moisture, and forming a pattern or washing finished surface with high accuracy on the surface of a concrete product.

A further object of the invention is to provide a retardative sheet which insures inhibition of fluidization of a retarder when a mortar composition is placed, and provides uniform inhibition of hardening of the mortar in the contact surface with the mortar composition and hence insures accurate formation of a pattern or washing finished surface on a surface of a concrete product.

It is a yet another object of the invention to provide a sheet which is useful for decorating a surface of concrete with an ornament or others while inhibiting damage of the surface and hence for providing a dress finished concrete product.

A still further object of the invention is to provide a retardative sheet which insures easy and efficient formation of a pattern or washing-finished surface on a surface of a concrete product.

It is an another object of the invention to provide a retardative sheet which insures easy formation of a complicated pattern on a surface of a concrete product and hence provides improved decorating quality.

DISCLOSURE OF THE INVENTION

The inventors of the present invention made much investigation to accomplish the above objects, and, as a result, found (1) that the use of a polyester as produced by esterifying a specific polycarboxylic acid component and a polyhydric alcohol component for the formation of a high molecular weight compound results in maintenance of insolubility with respect to water, and although the polyester itself does not have inherent retarding property with respect to cement, when mortar or concrete is deposited, the polyester is gradually and effectively hydrolyzed by strong alkalinity of the mortar or concrete, and hence a hydrolyzed product (hydrolysate) exhibits remarkably effective retardancy with respect to the cement accompanying with hardening of cement. They further found (2) that supporting or holding of a retarder (retardant) having retardancy (inhibiting activity) for hardening of cement to a sheet results in accurate formation of a pattern or washing finished surface on a surface of a concrete product. The present invention has been accomplished based on the above findings.

Thus, the cement retarder (cement hardening-retardant) comprises a polyester obtainable by a reaction of a polycarboxylic acid component comprising a polycarboxylic acid having 2 to 6 carbon atoms in the main chain or its derivative, and a polyol component comprising a polyhydric alcohol having 2 to 4 carbon atoms or its condensate. The polycarboxylic acid may be a saturated dicarboxylic acid having 2 to 5 carbon atoms in the main chain, or an unsaturated dicarboxylic acid having 4 to 6 carbon atoms in the main chain (backbone chain) and having an ethylenically unsaturated bond, such as maleic acid and maleic anhydride. The polycarboxylic acid component may further contain an aromatic dicarboxylic acid such as phthalic acid or its derivative. The main repeating unit of the polyester may comprise a repeating unit having 4 to 9 carbon atoms.

The cement retarder may also comprise a cured product of an unsaturated polyester, such as a cured product of (i) a polymerizable composition comprising an unsaturated polyester and a polymerization initiator, and (ii) a polymerizable composition comprising an unsaturated polyester, a polymerizable vinyl monomer and a polymerization initiator. The cured product may be used in the form of powder or granule (particle).

The cement retardative sheet of the present invention includes (A1) a cement retardative sheet comprising a base sheet and a composition supported or held by the base sheet, which composition comprises a cement retardant composed of a polyester obtainable by a reaction of a polycarboxylic acid component comprising a polycarboxylic acid having 2 to 6 carbon atoms in the main chain or its derivative, and a polyol component comprising a polyhydric acid having 2 to 4 carbon atoms or its condensate, and (A2) a cement retardative sheet comprising a base sheet and a retardative layer containing a concrete retarder and a tacky adhesive or an adhesive formed on the surface of the base sheet, typically speaking.

The use of a sheet having tacky adhesive property or adhesive property provides adhesion of a dressing material such as stone or tiles to the retardative layer utilizing the tacky adhesive property or adhesive property, and insures formation of a homogeneous washing-finished surface or pattern on a surface of a concrete and hence provides a concrete product with an excellent decorative quality.

Therefore, when the retardative sheet (A2) is used, a decorative material kit sheet is obtained by applying plural decorative materials continuously or in scattered form to a retardative layer having tacky adhesive property (pressure-sensitive adhesive property) or adhesive property. Thus, a dressing-finished concrete product is obtainable by disposing the above decorative material kit sheet in a form (shuttering), placing an inorganic curable composition and curing the composition, dislodging the cured or hardened product from the form, removing the tacky adhesive or adhesive sheet, and washing the surface of the exposed decorative material.

Incidentally, the term "sheet" as used in the present specification means a two-dimensional structure inclusive of a film, being irrespective of its thickness. The term "derivative of a polycarboxylic acid" as used herein includes an acid anhydride, and a lower alkyl ester (e.g. $C_{1-4}$ alkyl ester which is capable of eliminating, such as a methyl ester and an ethyl ester) of a polycarboxylic acid. The term "tacky adhesive or adhesive" may generically referred to as "the tacky adhesive", and the terms "tacky adhesive layer or adhesive layer" and "tacky adhesive property or adhesive property" may generically be referred to as "the pressure-sensitive adhesive layer" and "the pressure-sensitive adhesive property", respectively. Further, the term "cement" means an inorganic substance having curing or hardening property as mixed with water, and includes an air-hardening cement (non-hydraulic cement), a hydraulic cement and other cement, otherwise specifically mentioned. The hardenable (curable) composition comprising cement includes a cement paste, a mortar composition and a concrete composition, and they may be simply and generically referred to as "the inorganic hardenable composition".

BEST MODE FOR PRACTICING THE INVENTION

Cement Retarder of the Present Invention

The cement retarder (cement hardening-retardant) of the present invention comprises a polyester obtainable by a reaction of a polycarboxylic acid component comprising a polycarboxylic acid or its derivative, and a polyol (polyhydric alcohol) component comprising a polyhydric alcohol or its condensate. The polycarboxylic acid includes a saturated polycarboxylic acid shown by the formula $HOOCR^1COOH$, wherein $R^1$ represents a direct bond of the both carboxyl groups, or an alkylene group having 1 to 4 carbon atoms in the main chain, and an unsaturated polycarboxylic acid having an ethylenically unsaturated bond or other polymerizablly unsaturated bond, which is shown by the formula $HOOCR^2COOH$, wherein $R^2$ represents an aliphatic hydrocarbon group having 2 to 4 carbon atoms in the main chain (principle chain) and containing an unsaturated double bond. In the above formulae, the alkylene group of $R^1$ and the unsaturated hydrocarbon group of $R^2$ may be branched, but the number of the carbon atom(s) of the substituent, such as an alkyl group, branched from the main chain is not included in the number of the carbon atom(s) of the main chains of $R^1$ and $R^2$. Hereinafter, "the number of carbon atoms of the polycarboxylic acid" means the number of carbon atoms in the main chain, otherwise particularly specified.

As the polycarboxylic acid, wherein $R^1$ is a direct bond or an alkylene group having 1 to 4 carbon atoms in the main chain (that is, the number of the carbon atom(s) of the main chain is 2 to 6 inclusive of the carbon atom of the carboxyl group), there may be mentioned, for example, oxalic acid, malonic acid, succinic acid, glutaric acid, adipic acid and others. The unsaturated polycarboxylic acid wherein $R^2$ is an unsaturated aliphatic hydrocarbon group having 2 to 4 carbon atoms in the main chain (namely an unsaturated hydrocarbon group having 4 to 6 carbon atoms in the main chain inclusive of the carbon atoms of the carboxyl group) includes aliphatic dicarboxylic acids (e.g. maleic acid, maleic anhydride, fumaric acid, itaconic acid, itaconic anhydride, citraconic acid, citraconic anhydride, mesaconic acid, etc.). The saturated carboxylic acid and the unsaturated carboxylic acid may be used in combination with each other. These polycarboxylic acids may be employed singly or in combination.

The polycarboxylic acid component may further comprise, in addition to the above polycarboxylic acid, an aliphatic polycarboxylic acid (e.g. azelaic acid, sebacic acid, etc.) or an aromatic polycarboxylic acid (e.g. phthalic acid, phthalic anhydride, terephthalic acid, isophthalic acid, trimellitic acid, pyromellitic acid, etc.). In particular, the use of a polycarboxylic acid component containing an aromatic dicarboxylic acid or its derivative selected from the group consisting of phthalic acid, terephthalic acid, isophthalic acid and derivatives of these acids is useful for adjusting or controlling the characteristics of the saturated or unsaturated polyester, such as strength, elongation, flexibility, plasticity, water-resistance or others.

The content of the aromatic polycarboxylic acid based on the total of the polyester is, for instance, about 0.1 to 30% by weight, preferably about 0.1 to 20% by weight (e.g. about 1 to 15% by weight), and more preferably about 0.1 to 10% by weight (e.g. about 2 to 10% by weight).

The preferred polycarboxylic acid includes (1) a dicarboxylic acid component comprising a saturated or unsaturated aliphatic dicarboxylic acid having 2 to 6 carbon atoms or its derivative (particularly, a dicarboxylic acid component comprising a saturated aliphatic dicarboxylic acid having 2 to 5 carbon atoms, or at least maleic acid or its derivative), or (2) a dicarboxylic acid component comprising a saturated or unsaturated aliphatic dicarboxylic acid having 2 to 6 carbon atoms or its derivative, and at least one aromatic dicarboxylic acid selected from the group consisting of phthalic acid, terephthalic acid and isophthalic acid, or a derivative of these acids. Typically preferred polycarboxylic acid component comprises (3) a saturated dicarboxylic acid having about 2 to 4 carbon atoms or its derivative, (4) an unsaturated dicarboxylic acid having 4 or 5 carbon atoms or its derivative (in particular, maleic acid or maleic anhydride), or (5) a combination of the above saturated dicarboxylic acid (3) and/or the unsaturated dicarboxylic acid (4) (particularly, maleic acid or maleic anhydride), and an aromatic dicarboxylic acid or its derivative (in especial, an aromatic $C_8$ dicarboxylic acid or its derivative).

As examples of the polyol component, there may be mentioned polyhydric alcohols each having 2 to 4 carbon atoms, such as diols (e.g. ethylene glycol, propylene glycol, trimethylene glycol, 1,3-butanediol, tetramethylene glycol and other $C_{2-4}$ alkylene glycols), polyoxyalkylene glycols as condensates of a $C_{2-4}$ alkylene glycol, such as dioxyethylene glycol, trioxyethylene glycol, polyoxyethylene glycol (hereinafter these substances may simply and generically be referred to as "the polyethylene glycol", otherwise specified), dioxypropylene glycol, trioxypropylene glycol, polyoxypropylene glycol (hereinafter these may be simply be referred to as "the polypropylene glycol" otherwise particularly referred to), polyoxytetramethylene glycol and so on; polyols (e.g. glycerin, diglycerin, polyglycerin). These polyol components may be used independently or in combination.

The preferred polyhydric alcohol includes, ethylene glycol, propylene glycol, trimethylene glycol, tetramethylene glycol, dioxyethylene glycol, trioxyethylene glycol, polyoxyethylene glycol, dioxypropylene glycol, trioxypropylene glycol, polyoxypropylene glycol, and glycerin. The polyhydric alcohol may practically comprise a diol component, in particular, a diol component composed of an aliphatic diol having 2 to 4 carbon atoms or its condensate.

The molecular weight of the polyoxyalkylene glycol may be such that the weight average molecular weight is about 100 to 7,500, and preferably about 200 to 5,000 (e.g. about 200 to 2,500). When the polyethylene glycol is used, it may practically have a weight average molecular weight of not greater than 300.

The glycol component comprising propylene glycol or the polypropylene glycol is useful for imparting flexibility and hydrophilic property and for enhancing solubility with respect to a polymerizable monomer such as a styrenic or acrylic monomer.

The polyhydric alcohol may be employed, as necessary, in combination with other polyol such as trimethylolethane, trimethylolpropane and pentaerythritol.

The main repeating unit -($R^a$COO$R^b$OCO)—, wherein $R^a$ represents a residue of a polycarboxylic acid, and $R^b$ represents a residue of a polyhydric alcohol, of the polyester may practically be composed of a repeating unit having 4 to 9 carbon atoms (that is, a repeating unit in which the total number of the carbon atoms of the polycarboxylic acid and the polyhydric alcohol is 4 to 9).

Among these polyesters, an unsaturated polyester, in particular an unsaturated polyester containing maleic acid or maleic anhydride as the polycarboxylic acid component, can preferably be employed.

The molecular weight of the polyester is not particularly limited and may be selected from the range where the weight average molecular weight is, for example, about 300 to 100,000 (e.g. about 300 to 25,000), preferably about 300 to 50,000 (e.g. about 500 to 15,000) and more preferably about 500 to 20,000. The molecular weight of the unsaturated polyester is such that the weight average molecular weight is about 300 to 100,000, preferably about 300 to 50,000 and more preferably about 500 to 10,000. The unsaturated polyester may practically have a weight average molecular weight of about 300 to 5,000 (e.g. about 500 to 5,000) and particularly about 500 to 2,500. The molecular weight means a weight average molecular weight, in terms of styrene, determined by gel permeation chromatography.

The polyester may be either in an oily or solid form. The oily polyester as intact, and the solid polyester as dissolved in an organic solvent, may be applied or impregnated to a base sheet (e.g. a non-porous sheet such as a plastic sheet and a metal foil, a porous sheet such as paper and a nonwoven fabric), or applied to the inner bottom or internal side wall of a form made from wood, for instance, with the use of a brush or spray. The solid polyester may be employed in the form of a particle (powder or granule), or may be heated and molten to apply or impregnate to the base sheet.

The polyester inclusive of the unsaturated polyester can be obtained by a conventional technology, such as a process which comprises condensing the polycarboxylic acid component and the polyhydric alcohol component in the presence of a catalyst. When an unsaturated polycarboxylic acid such as maleic acid or maleic anhydride is used, the condensation reaction may practically be conducted in the presence of hydroquinone or other radical polymerization inhibitor. The ratio of the polyhydric alcohol can be selected from the range of about 0.5 to 3 equivalents and preferably about 0.7 to 2 equivalents relative to 1 equivalent of the polycarboxylic acid. A polyester having a low molecular weight may practically be obtained by using one component between the polycarboxylic acid component and the polyol in an excess amount.

The cement retarder of the present invention may be composed of the polyester, or when the polyester is an unsaturated polyester, it may be composed of a cured product of the unsaturated polyester.

The cured product of the unsaturated polyester can be obtained by curing the polymerizable composition (i) comprising the unsaturated polyester and a polymerization initiator. As the polymerization initiator, use can be made of any of various organic peroxides, such as methyl ethyl ketone peroxide, cumene hydroperoxide, benzoyl peroxide, t-butyl peroxybenzoate, t-butylperoxy-2-ethylhexanoate, dicumyl peroxide and so forth. The amount of the polymerization initiator may be selected from the range not interfering with polymerizability, and is for instance about 0.5 to 5 parts by weight, preferably about 1 to 4 parts by weight and practically about 2 to 3 parts by weight relative to 100 parts by weight of the unsaturated polyester.

Such polymerizable composition (i) insures an improved handling property by using as a powdery cement retarder as produced by self-crosslinking the unsaturated polyester with the polymerization initiator, even when the unsaturated polyester constituting the cement retarder has a low molecular weight such as an oily polyester which is poor in handling property. The polymerizable composition (i) containing an unsaturated polyester having a weight average molecular weight of about 300 to 5,000 has a comparatively low viscosity and hence has a high applicability or impregnating property with respect to the base sheet. The polymerizable composition can be held or supported by the sheet as a crosslinked composition by means of curing.

The cured product of the unsaturated polyester may be a cured product of the polymerizable composition (ii) comprising the unsaturated polyester, a polymerizable vinyl monomer (a reactive diluent) and the polymerization initiator. The polymerizable vinyl monomer includes, for example, styrene, α-methylstyrene, vinyl-toluene and other styrenic monomers, methyl (meth)acrylate, ethyl (meth)acrylate, butyl (meth)acrylate and other alkyl (meth)acrylates each having about 1 to 20 carbon atoms in the alkyl group, particularly about 1 to 10 carbon atoms, 2-hydroxyethyl (meth)acrylate, 2-hydroxypropyl (meth)acrylate, 3-hydroxypropyl (meth)acrylate, (meth)acrylic acid, glycidyl (meth)acrylate and other monomers each having a functional group (e.g. hydroxyl group, carboxyl group, glycidyl group and so on), esters of (meth)acrylic acid and the above-mentioned polyhydric alcohol (e.g. the polyethylene glycol) such as ethylene glycol di(meth)acrylate and polyethylene glycol di(meth)acrylate. As the vinyl monomer, use may also be made of vinyl acetate and other vinyl esters, vinyl chloride and other halogen-containing vinyl monomers, acrylonitrile and other vinyl cyanide, ethylene, propylene and other olefinic monomers. These polymerizable monomers may be employed singly or in combination.

The preferred vinyl monomer includes styrenic monomers, acrylic monomers and methacrylic monomers.

The proportion of the polymerizable vinyl monomer may be selected, according to the molecular weight of the unsaturated polyester, from a range not adversely affecting the retarding property or the handling property of the unsaturated polyester, and is, for instance, about 1 to 500 parts by weight (e.g. about 1 to 100 parts by weight), preferably about 5 to 200 parts by weight (e.g. about 5 to 100 parts by weight) and practically about 5 to 30 parts by weight relative to 100 parts by weight of the unsaturated polyester.

The polymerizable composition (ii) is easy to take out from a reactor even when it comprises a solid or viscous unsaturated polyester because of addition of the polymerizable vinyl monomer, and even when the unsaturated polyester is liquid or viscous which is difficult to be handled, the composition has an improved handling property by crosslinking and curing the unsaturated polyester to use as a powdery cement retarder. Further, the polymerizable composition (ii) can be supported or held as a crosslinked composition by a base sheet by means of applying or impregnating the composition to the base sheet and curing the composition.

The cured product of the unsaturated polyester may be a cured product of a polymerizable composition (iii) which comprises a polymerization accelerator (polymerization promotor) in addition to the constitutive components of the above-mentioned polymerizable composition (i.e. the unsaturated polyester and the polymerization initiator each constituting the polymerizable composition (i), or the unsaturated polyester, the polymerizable vinyl monomer and the polymerization initiator each constituting the polymerizable composition (ii)). The polymerization accelerator includes, for example, cobalt naphthenate, cobalt octylate and other organic acid salts of cobalt, acetylacetone, ethyl acetoacetate and other β-diketones, aromatic tertiary amines, a mercapto and others. These polymerization accelerators may be used independently or in combination.

The concentration of the polymerization accelerator (polymerization promoter) in the polymerizable composition may be selected within the range of, for instance, about 10 to 1,000 ppm, preferably about 10 to 500 ppm (e.g. about 10 to 100 ppm), and the accelerator may practically be used in a concentration of about 30 to 50 ppm.

The curing (crosslinking) of the unsaturated polyester can be carried out at ambient temperature (room temperature), but it is advantageous to conduct the curing at about 60 to 200° C. for curing the unsaturated polyester in a short period (e.g. about 0.5 to 50 minutes).

As described above, the cement retarder of the present invention may be composed of an oily or solid (e.g. a particulate) saturated polyester or unsaturated polyester. The cured product of the unsaturated polyester as the retarder may be employed in the form of a particle (powder or granule) or used as supported or held by the base sheet as a crosslinked composition. The particle size of the particulate saturated polyester or unsaturated polyester and the particulate cured product is not strictly limited, and may optionally be selected within the range of an average particle size of about 0.1 to 1,000 μm, and preferably about 0.1 to 500 μm.

The cement retarder of the invention may be used in combination with other retarder. Further, the cement retarder of the invention may comprise, according to the species of the polyester, a variety of additives, such as pigments, dyes and other coloring agents, ultraviolet ray absorbers, antioxidants and other stabilizers, polymerization inhibitors, plasticizers, antifoaming agents, emulsifiers, hydrolysis accelerators, inorganic salts, metallic oxides, sand and other fillers.

The polyester itself constituting the cement retarder of the invention scarcely has retardative property with respect to cement, or even if it has retardative property, the retardative property is extremely small. Further, being different from conventional retarders, the retarder of the invention is hardly dissolved in water, and hence scarcely flows with a bleeding water from mortar or concrete. However, the ester bond of the polyester is hydrolyzed due to strong alkalinity of the uncured mortar or concrete, and hence carboxyl group and hydroxyl group, which are useful for retardation, are liberated. The rate of hydrolysis increases accompanied with utilization of the water in the mortar or concrete for hardening of the cement, and the rate becomes maximum due to heat derived from the concrete during the curing, and further when the curing is conducted under heating, due to the heat thereof, and the liberated carboxyl group and hydroxyl group synergistically exhibit great retardative activity. On the other hand, the concrete at the stage, where the retardative activity is exhibited, is yet uncured but already has no fluidity, and hence when the retardative component is liberated due to hydrolysis of the polyester, the retardative component does no more move as dissolved in bleeding water. Therefore, the retardative activity (retardative property) can be exhibited at desired part or portion and no other, and a letter, a picture and other patters can be formed by washing-finish after hardening of the cement.

Although the cement retarder of the invention is useful for the formation of a desired pattern with high accuracy, it can also be added to mortar or concrete for the same applications as conventional retarders, such as long-term inhibition of hardening of a ready-mixed concrete in summer, or mitigation of stress due to heat (temperature) in a large-sized concrete structure.

Cement Retardative Sheet of the Present Invention

The cement retardative sheet of the invention can roughly be classified into (A1) a retardative sheet which comprises a base sheet and a composition comprising the cement retarder composed of the saturated or unsaturated polyester supported or held by the base sheet, or (A2) a retardative sheet which comprises a base sheet and a retardative layer comprising the concrete retarder and a tacky adhesive or an adhesive formed on the base sheet.

Cement Retardative Sheet (A1)

In the cement retardative sheet (A1), the composition comprising the saturated or unsaturated polyester is held or supported by the base sheet. The composition may be used as intact when the polyester is in the oily form. The polyester may be heated and molten to be applied or impregnated to the base sheet, and irrespective of its shape (e.g. a solid), the polyester may be used as dissolved in an organic solvent. As the organic solvent, there may be mentioned, for example, ethanol, isopropanol and other alcohols, hexane and other aliphatic hydrocarbons, cyclohexane and other alicyclic hydrocarbons, benzene, toluene, xylene and other aromatic hydrocarbons, dichloromethane, dichloroethane and other halogenated hydrocarbons, acetone, methyl ethyl ketone and other ketones, ethyl acetate and other esters, diethyl ether, tetrahydrofuran and other ethers, and mixtures of these solvents.

When the polyester is the unsaturated polyester, the polyester may be used as either of the above-mentioned polymerizable compositions, that is, (i) the polymerizable composition comprising the unsaturated polyester and polymerization initiator, (ii) the polymerizable composition comprising the unsaturated polyester, polymerizable monomer and polymerization initiator, or (iii) the polymerizable composition as prepared by adding the polymerization accelerator to the compositions (i) or (ii).

Further, when the polyester is in the particulate form (in especial, a particle of the cured product of the unsaturated polyester), the polyester may be employed as a composition comprising the particle of the polyester and a tacky adhesive or adhesive. The tacky adhesive or the adhesive includes, for instance, naturally-occurring rubbers, synthetic rubbers, (e.g. neoprene, isoprene) and other rubber-series pressure-sensitive adhesives, poly(vinyl acetate), an ethylene-vinyl acetate copolymer and other vinyl acetate-based elastomers, acrylic rubber and other acrylic elastomers, polyester elastomers and so on. These tacky adhesives may be any of emulsion tacky adhesives or solution tacky adhesives. Furthermore, water-soluble viscous substances can also be used, and such substances include, for example, poly(vinyl alcohol), poly(acrylic acid), polyacrylamide, methyl cellulose, hydroxyethyl cellulose, carboxymethyl cellulose and other synthetic water-soluble polymers, locust bean gum, guar gum, gum arabic, tragacanth rubber, pectin, sodium alginate, carragheenin and other naturally-occurring water-soluble polymers. These tacky adhesives and adhesives may be employed singly or in combination. The tacky adhesive composition may be use in combination with a tackifier (e.g. petroleum resins, terpene resins, dicyclopentadiene-series resins and other hydrocarbon resins, rosin derivatives). The composition of the tacky adhesive or adhesive may comprise an inorganic filler for controlling or regulating tackiness of the composition.

In the composition comprising particles of the polyester and the tacky adhesive or adhesive, the content of the tacky adhesive or adhesive may only be within the range not deteriorating retardative property, tackiness or adhesive property, and is, for example, about 10 to 2,000 parts by weight, preferably about 50 to 1,000 parts by weight and more preferably about 100 to 500 parts by weight relative to 100 parts by weight of the particulate polyester.

The base sheet includes a plastic sheet, a metal foil and other non-porous sheets, and paper, a woven or non-woven fabric and other porous sheets, typically speaking. Among these base sheets, the preferred non-porous sheet includes a plastic sheet, and the desirable porous sheet includes a plastic non-woven fabric.

There is no particular restriction for the constitutive polymer of the base sheet, and the polymer includes, for instance, polyethylene, polypropylene and other olefinic polymers; poly(ethylene terephthalate), poly(butylene terephthalate) and other polyesters (especially, a poly (alkylene terephthalate)); an ethylene-vinyl acetate copolymer, an ethylene-acrylic acid copolymer; acrylic resins; polystyrene; poly(vinyl chloride); polyamide; polycarbonate; poly(vinyl alcohol), an ethylene-vinyl alcohol copolymer and the like. These polymers can be used singly or in combination. The preferable base sheet includes a plastic sheet or non-woven fabric as produced by using poly(ethylene terephthalate) or other poly(alkylene terephthalate). The base sheet may also be a sheet improved in hand-tearability or dimensional stability.

The base sheet may be either of a single sheet or a composite sheet as produced by laminating plural layers, such as a composite sheet produced by laminating one side or both sides of a cloth made of woven fibers such as polyethylene fibers, with the sheet such as polyethylene. The base sheet such as a plastic sheet may be either of a non-oriented sheet or monoaxially or biaxially oriented sheet. Further, the surface of the base sheet may be subjected to surface treatment such as flame treatment, corona discharge treatment and plasma treatment in order to improve the adhesive property with respect to the composition comprising the polyester. The surface tension of the base sheet of which surface has been treated may practically be not less than about 40 dyne/cm.

The thickness of the base sheet may be selected from the range not adversely affecting workability and mechanical strength, and is, for example, about 15 to 500 $\mu$m, preferably about 20 to 400 $\mu$m, more preferably about 30 to 300 $\mu$m and practically about 50 to 300 $\mu$m.

The shape or form of the supporting of the polyester (preferably the unsaturated polyester) with respect to the base sheet is not particularly restricted, and can be selected according to the species of the composition comprising the polyester. By way of illustration, the polyester may be supported or held by the base film by means of applying or impregnating the base sheet with the composition comprising the saturated or unsaturated polyester, or applying or impregnating the base sheet with any of the polymerizable compositions (i) to (iii) and heating the same to cure or crosslink and thereby to form a crosslinked composition as held or supported by the base sheet. The polymerization or crosslinking of the polymerizable composition may be conducted at an ambient temperature (room temperature) but, usually, at a temperature not lower than 100° C. (e.g. about 100 to 200° C.), preferably about 100 to 170° C. (e.g. about 100 to 150° C.) and practically about 120 to 150° C.

The composition comprising the particulate polyester and the tacky adhesive or adhesive may be held or supported by the base sheet by means of applying or impregnating the composition to the base sheet. Further, when the particulate (powdery or granular) polyester is used, the polyester may be held or supported on the base sheet by applying the particulate polyester to a tacky adhesive layer (pressure-sensitive adhesive layer) or adhesive layer formed on the surface of the base sheet by means of scattering or spreading. Incidentally, the particulate polyester may be obtained in a manner according to the form of the polyester, for example, by cooling and pulverizing the polyester.

The thickness of the sticky adhesive layer containing the particulate polyester is, for instance, about 30 to 500 $\mu$m, preferably about 100 to 500 $\mu$m, more preferably about 150 to 300 $\mu$m and practically about 200 to 250 $\mu$m.

Cement Retardative Sheet (A2)

The cement retardative sheet (A2) comprises a base sheet, and a retardative layer comprising a concrete retarder and a tacky adhesive or an adhesive and formed on the base sheet. As the concrete retarder, use can be made of other retarder in addition to the above-mentioned polyester.

As the base sheet, tacky adhesive or adhesive, there may be used the similar base sheet, tacky adhesive and adhesive to those mentioned above.

The species of the other retarder than the polyester is not particularly restricted as far as being a hardening retarder or setting retarder which retards hardening rate of cement, and any of inorganic or organic retarders can be employed. The inorganic retarder includes a phosphoric acid, a boric acid or salts of these acids, hexafluorosilicate and so forth.

As the organic retarder, there may be mentioned, for instance, phosphonic acid compounds each having a phosphono group $PO_3H_2$, and non-phosphonic acid-based compounds.

Phosphonic acid-series retarder

The phosphonic acid-series retarder includes aminodi (methylenephosphonic acid), aminotri (methylenephosphonic acid), 1-hydroxyethylidene-1,1-diphosphonic acid, ethylenediaminetetra (methylenephosphonic acid), diethylenetriaminepanta (methylenephosphonic acid), hexamethylenediaminetetra (methylenephosphonic acid) or salts thereof.

Examples of the salt include salts with ammonia, sodium, potassium and other alkali metals, calcium, and magnesium, barium and other alkaline earth metals. As the salt of the phosphonic acid-series compound, there may be mentioned, for example, pentasodium aminotri (methylenephosphonate), tetrasodium 1-hyroxyethylidene-1,1-diphosphonate, calcium sodium ethylenediaminetetra (methylenephosphonate), potassium hexamethylenediaminetetra(methylenephosphonate), sodium diethylenetriaminepenta(methylenephosphonate) and so on.

Non-phosphonic acid-series retarder

As examples of the non-phosphonic acid retarder, there may be mentioned glycolic acid, lactic acid, malic acid, tartaric acid, citric acid, gluconic acid, and other hydroxycarboxylic acids or their salts; oxalic acid, malonic acid and other saturated polycarboxylic acids, fumaric acid, itaconic acid and other unsaturated polycarboxylic acids, glucoheptanoic acid and other polycarboxylic acids or their salts; poly(maleic acid), poly(fumaric acid), a styrene-maleic acid copolymer, poly(acrylic acid), poly(methacrylic acid), a styrene(meth)acrylic acid copolymer, a (meth)acrylate-(meth)acrylic acid copolymer, an ethylenesulfonic acid-acrylic acid copolymer and other homo- or co-polymer of a monomer having a carboxyl group or salts thereof (preferably, a low molecular weight polymer or its salt); antioxidants (e.g. ascorbic acid, isoascorbic acid, etc.); polymers such as polyhydroxysilane and polyacrylamide (preferably, a polymer with a low molecular weight); carbohydrates (e.g. sucrose and other polysaccharides, corn syrup, etc.); fumic acid; lignin sulfonic acid or a lignosulfonate (e.g. calcium lignosulfonate) and others.

Among these retarders, use can advantageously be made of at least one component selected from the group consisting of phosphonic acid compounds, hydroxycarboxylic acids, polycarboxylic acids, homo- or copolymers of a monomer having a carboxyl group, isoascorbic acid, phosphoric acid, boric acid or their salts, polyhydroxysilane and a haxafluorosilicate. As the retarder, phosphonic compounds, hydroxycarboxylic acids, polycarboxylic acids, isoascorbic acid or salts of these acids may practically be used. In particular, a combination of a phosphonic acid compound and a hydroxycarboxylic acid can advantageously be employed. Such combination includes, for instance, a combination of aminotri(methylenephosphonic acid) and citric acid. The relative proportion of the phosphonic acid compound to the hydroxycarboxylic acid is such that the former/the later equals about 100/25 to 500 (by weight), and preferably about 100/50 to 250 (by weight). The preferred retarder may practically contain an acidic group (e.g. phosphonic acid group, carboxyl group, sulfonic acid group) or its salt, and may practically be water-soluble. The retarders may be used independently or in combination.

The amount of the concrete retarder is, relative to 100 parts by weight of the tacky adhesive or adhesive, about 5 to 1,000 parts by weight, preferably about 10 to 700 parts by weight, and more preferably about 25 to 500 parts by weight. The concrete retarder may practically be used in a proportion of about 25 to 400 parts by weight (e.g. about 50 to 300 parts by weight) relative to 100 parts by weight of the tacky adhesive or adhesive.

Where necessary, the composition comprising the retarder and tacky adhesive or adhesive may further comprise an organic solvent or an additive as mentioned above.

The cement retardative sheet (A2) can be obtained by applying a composition comprising the retarder and tacky adhesive or adhesive to the base sheet, and drying the resultant product.

In the retardative sheets (A1) and (A2), the composition comprising the retarder may only be applied at least one side of the base sheet.

The cement retardative sheet may also be (A3) a sheet composed of a resin having cement retardative property (e.g. the polyester such as the unsaturated polyester), or (A4) a sheet composed of a composition comprising the cement retarder. Incidentally, the sheet (A3) comprising the retardative resin may contain the retarder.

The retardative sheets (A3) and (A4) may be prepared with the use of a composition containing a retardative resin, or the retarder and a sheet-formable resin, by a conventional molding technology such as extruding, fluid-extending, calendaring and others.

As examples of the sheet-formable resin, there may be mentioned thermoplastic resins (e.g. polyethylene, polypropylene and other olefinic polymers; poly(ethylene terephthalate), poly(butylene terephthalate), poly(1,4-dimethylol-cyclohexane terephthalate) and other polyesters; nylon 46, nylon 6, nylon 66, nylon 610, nylon 612, nylon 11, nylon 12 and other polyamides; poly(vinyl acetate), an ethylene-vinyl acetate (EVA) copolymer, a vinyl acetate-vinyl vasaticate copolymer (VA-VeoVa) and other vinyl ester-series resins; poly(vinyl alcohol), an ethylene-vinyl alcohol copolymer and other saponified products of vinyl ester-series resins; an ethylene-ethyl acrylate copolymer, an ethylene-(meth)acrylic acid copolymer; poly(vinyl chloride), a vinyl chloride-vinyl acetate copolymer, a vinylidene chloride-vinyl acetate copolymer, polychloroprene and other halogen-containing polymers; an acrylic resin, a styrene-(meth)acrylate copolymer and other acrylic polymers; polystyrene, a styrene-butadiene copolymer, a styrene-butadiene-acrylonitrile copolymer and other styrenic polymers; methyl cellulose, hydroxyethyl cellulose, cellulose acetate and other cellulosic polymers; naturally-occurring polymers, etc.), thermosetting resins (e.g. thermosetting acrylic resins, unsaturated polyester resins, vinyl ester resins, diallyl phthalate resins, epoxy resins, urea resins, phenol resins and so on). These resins may be used singly or in combination. Typically preferred resin as the sheet-formable resin is practically a hydrophilized resin such as a hydrophilic resin (e.g. a water-soluble or water-dispersible resin) or a latex or an emulsion.

The proportion of the retarder in the retardative sheet (A4) is, for example, about 5 to 1,000 parts by weight, preferably about 10 to 700 parts by weight, more preferably about 25 to 500 parts by weight and practically about 25 to 400 parts by weight (e.g. about 50 to 300 parts by weight) relative to 100 parts by weight of the resin.

The cement retardative sheet may also be (A5) a sheet which has been imparted with tacky adhesive property or adhesive property by means of incorporating a tacky adhesive or an adhesive into a sheet, or application of the tacky adhesive or adhesive to the sheet. The content of the tacky adhesive in the sheet (A5) containing the tacky adhesive is, for instance, about 10 to 500 parts by weight, preferably about 25 to 400 parts by weight and more preferably about 50 to 300 parts by weight relative to 100 parts by weight of the retardative resin or sheet-formable resin. The sheet (A5) may practically contain the tacky adhesive in an amount of 25 to 250 parts by weight relative to 100 parts by weight of the retardative resin or sheet-formable resin.

When the tacky adhesive layer or adhesive layer is formed by application or coating, the tacky adhesive layer or adhesive layer may be formed, according to the species and content of the retarder, in a thickness of about 0.1 to 150 $\mu$m, preferably about 1 to 120 $\mu$m and more preferably about 10 to 100 $\mu$m, typically speaking.

Further, the retardative sheet may also be a retardative sheet (A6) composed of a non-tacky adhesive or non-adhesive retardative layer as produced in the same manner as the retardative layer of the retardative sheet (A2) except for using a binder resin in leu of the tacky adhesive or adhesive.

As the binder resin, there may be mentioned, for instance, poly(vinyl acetate), poly(vinyl alcohol), an ethylene-vinyl acetate copolymer, an ethylene-ethyl acrylate copolymer, an acrylic polymer, polystyrene, a styrene-acrylate copolymer, a polyester, a polyacetal, poly(vinyl chloride), a vinyl chloride-vinyl acetate copolymer, a polyamide, a polyurethane, a polycarbonate, a chlorinated polypropylene and other chlorinated polyolefins, acetyl cellulose, acetyl-butyl cellulose, ethyl cellulose, nitrocellulose and other cellulosic polymers, elastomers (e.g. a naturally-occurring rubber, a chlorinated rubber, a hydrochlorinated rubber, butadiene rubber, isoprene rubber, a styrene-butadiene rubber, an acrylonitrile-butadiene rubber, butyl rubber, chloroprene rubber, an ethylene-propylene rubber, an ethylene-propylene-nonconjugated diene rubber, an acrylic rubber, a chlorosulfonated polyethylene rubber, silicone rubber, a urethane rubber, etc.). These binder resins may be used singly or in combination.

The proportion of the retarder is, for example, relative to 100 parts by weight of the binder resin, about 5 to 1,000 parts by weight, preferably about 10 to 700 parts by weight, more preferably about 25 to 500 parts by weight, and practically about 25 to 500 parts by weight (e.g. about 50 to 400 parts by weight).

Moreover, the retardative sheet may be a retardative sheet (A7) as produced by forming a tacky adhesive layer or an adhesive layer on the surface of any of the retardative sheets (A1) to (A6). When the sheets (A1), (A2) or others have tacky adhesive property, the tacky adhesive layer or adhesive layer is not always required. The tacky adhesive layer or adhesive layer may only be formed at least on one side of the sheet having retardative property. As the tacky adhesive or adhesive, any of those as mentioned above can be employed.

The thickness of the tacky adhesive layer may be selected from the range in which the tacky adhesive property can be exhibited and inhibiting activity with respect to hardening of concrete is not adversely affected, and is, for example, about 0.1 to 50 $\mu$m (e.g. about 1 to 50 $\mu$m), preferably about 1 to 40 $\mu$m, more preferably about 2 to 30 $\mu$m and practically about 2 to 25 $\mu$m.

Preferably, the tacky adhesive layer is a layer from which the retarder is capable of leaching. The tacky adhesive layer from which the retarder can leach may be formed homogeneously on the surface of the retardative sheet, or heterogeneously thereon. When the tacky adhesive layer is formed homogeneously, the thickness of the layer is preferably thin, such as about 0.1 to 15 $\mu$m, preferably about 1 to 10 $\mu$m and more preferably about 1 to 5 $\mu$m. In case the tacky adhesive layer is formed heterogeneously, a scattered tacky adhesive layer may be formed as a regular pattern or an irregular pattern by means of a technology such as coating or printing, irrespective of the thickness of the layer.

When the surface of the retardative sheet has tacky adhesive property (tackiness), the tacky surface may practically be coated with a releasable protective sheet or paper such as a releasing paper (separating paper).

The retardative sheet may be cut suitably and used as a surface decorative sheet. By way of an example, a decorative finished (dressing finished) concrete product can be obtained by fixing, by means of applying, for instance, the cut retardative sheet to a part of an internal wall of a form corresponding to the washing part of the resultant concrete product, placing concrete, allowing the concrete to harden, thereafter removing the hardened concrete from the form, and washing off unhardened mortar of the surface of the concrete product corresponding to the part where the sheet has been applied to. Further, since the polyester as the cement retarder is supported or held by the base sheet, the retarder does not move when the concrete is placed, and the retarder is scarcely soluble in water so that it does not flow with bleeding water. Accordingly, a decorative pattern such as a letter or figure can clearly be formed with high accuracy on a desired surface portion of a concrete molded article (shaped article) or building.

The coating layer or retardative layer each comprising the retarder (hereinafter may briefly referred to as "the coating layer") in the retardative sheet may be releasable from the base sheet. When the coating layer is releasable from the base sheet, an optional portion or area corresponding to a desired pattern or figure in the coating layer is cut and released from the base sheet, the resultant sheet is disposed in a form, an inorganic hardenable composition (e.g. a mortar composition) is placed in the form to give a cured and hardened concrete product, and the contact surface of the concrete product in contact with the sheet is washed to give a washing finished surface in which a design, figure pattern or aggregate is exposed in a portion corresponding to the non-cut part of the surface of the concrete product. For the purpose of forming a releasable coating layer, the surface of the base film may be untreated, or treated with a mold releasing agent (mold lubricant) such as a wax, a higher fatty acid amide, a silicone oil and so on. The surface tensile of the base sheet may be relatively selected, in relation with the adhesive strength of the coating layer, from a range not interfering with the releasing property of the coating layer. The surface tensile of the coating layer is, for instance, not greater than 38 dyne/cm, preferably about 20 to 38 dyne/cm, and more preferably about 25 to 36 dyne/cm.

The retardative sheet being imparted with tacky adhesive property by means of the tacky adhesive (pressure-sensitive adhesive agent) is useful for production of a concrete product having a figure, design or washing surface on the surface thereof, or a concrete product which is integrated and fixed with a decorative material (an ornamental material). That is, the sheet is laid in a mold or form as the tacky adhesive surface being an upper side, the surface sides of plural dressing materials such as stones or tiles are arranged to the tacky adhesive surface by means of adhesion, and the decorative materials are located and fixed. Thereafter, an inorganic hardenable (curable) composition is deposited in the form (mold), and cured or hardened by means of a conventional hardening technology such as curing, and the hardened molded article is taken out from the mold. Thus, by washing the surface side (the contact side with the sheet) with water, a pressurized water or a jet stream, uncured composition attached to the dressing material can easily be removed, and, by removing the tacky adhesive, a concrete product as laminated with the cleaned surface-dressing materials (e.g. a dressed block, a precast concrete slab, etc.) can be obtained. When the dressing materials ar not adhered to the tacky adhesive surface of the sheet, the aggregate is exposed by washing and hence a pattern or washing surface can be formed.

The sheet laid in the form is in contact with the form on the face and hence the contact area is great so that rupture or misplacing due to placing of the inorganic hardenable composition can be inhibited. Therefore, the sheet is not required to be temporally fixed to the form by a temporally fixing means such as a pressure-sensitive adhesive double coated tape, but where necessary, the sheet may be temporarily fixed to the form with a temporally fixing means. Further, a joint sealant or joint filler (e.g. a joint rod made of a flexible plastic such as a polyurethane) for inhibiting adhesion of a mortar composition or others may be disposed in a gap portion (joint portion) between the disposed dressing materials, or a gap portion (joint portion) between the form and the dressing materials.

When the sheet composed of the coating layer or retardative layer containing the tacky adhesive is used, a kit sheet as produced by previously arranging or disposing a decorative material to the tacky adhesive layer may be disposed in the form without direct arrangement of the decorative material in the form. By way of illustration, a unit tile can be formed by applying plural tiles as decorative materials to the tacky coating layer continuously or as scattered in the surface direction on the surface of the layer. The plural tiles may practically be arranged adjacently each other (continuously) or with intervals in the surface direction (e.g. in a longitudinal direction, transverse direction (cross direction), or both longitudinal and transverse directions). The use of the decorative material kit sheet insures an improved working efficiency, since respective or separate arrangement of the decorative materials in the mold is not required and it is sufficient to dispose the decorative material kit sheet prepared in the other step in the mold.

The decorative material includes various materials such as boulders or cobblestones, black stones, Teppei stones and other naturally-occurring stones, artificial stones an other stones, tiles and other ceramic materials, metallic materials, glass, wood, woven fabrics and others. The decorative material may have a plane form, and the tile may be a mosaic tile or a divided tile. Further, where necessary in the production of the objected concrete product, the inorganic hardenable composition may be placed after disposing a reinforcement (reinforcing steel) or other reinforcing material into the form (mold).

The decorative material kit film such as the unit tile is useful for production of a dressing-finished concrete product inclusive of a precast concrete slab. That is, the decorative kit sheet is disposed as the back of the decorative material such as tiles being upper side in a form for concrete placement, a concrete is disposed in the form and cured, the hardened concrete is removed from the form, and the tacky adhesive sheet is removed to expose the surface of the decorative material. Thereafter, a precast concrete slab integrated with the decorative material can be obtained by washing the surface of the decorative material and hence washing out the uncured inorganic hardenable composition (e.g. cement, etc.) which has reached the surface of the decorative material. Namely, when the inorganic hardenable composition reaches the surface of the decorative material such as tiles, the retardant component in the sheet or retardative layer inhibits hardening or curing of the inorganic hardenable composition, and hence the inorganic composition remains semi-hardened (semi-hardened or unhardened) state. Therefore, surface finish for removing the inorganic hardenable composition from the surface of the decorative material can be conducted efficiently and completely by means of a simple and easy manner of washing such as washing with water.

The cement includes, for instance, an air-hardening cement (e.g. gypsum (plaster), slaked lime, dolomite plaster and other lime); a hydraulic cement (e.g. Portland cement, high-early-strength Portland cement, alumina cement, rapid-hardening high-strength cement, calcined gypsum and other self hardening cement; lime slag cement, blast-furnace-cement; cement mixtures). The preferable cement includes gypsum, dolomite plaster and hydraulic cement, typically speaking.

The cement may be used as a paste composition (cement paste) with water, or a mortar composition or concrete composition containing sand, quartz sand, pearlite or other fine aggregates and/or coarse aggregates. When a pattern is formed with the use of the retardative sheet by means of an aggregate which has been exposed to the surface accompanied with washing, a mortar composition containing an aggregate, among them a coarse aggregate, may be practically used. The surface of at least a part of the coarse aggregate may practically be smooth for the purpose of enhancing decorative quality.

The paste composition and the mortar composition may contain, as necessary, any of various additives such as coloring agents, hardening agents, calcium chloride and other hardening accelerator, sodium naphthalenesulfonate and other water reducing agents, coagulants, carboxymethyl cellulose, methyl cellulose, poly(vinyl alcohol) and other thickeners, foaming agents, synthetic resin emulsions and other waterproof agents, and plasticizers.

INDUSTRIAL APPLICABILITY OF THE INVENTION

The cement retarder and retardative sheet of the present invention are useful for production of various concrete products such as a curtain wall, a wall and other concrete panels, and concrete blocks, in particular for the manufacture of dressed concrete products (e.g. precast concrete slabs).

EXAMPLES

The following examples are intended to describe the present invention in more detail but should by no means limit the scope of the invention.

Example 1 and Comparative Example 1

A 1-liter three neck flask provided with a stirrer and a thermometer was charged with 204 g of ethylene glycol and 296 g of oxalic acid (mole ratio equals 1:1), and, with stirring, the charged was heated from ambient temperature to 150° C. with taking 3 hours, and thereafter heated from 150° C. up to 210° C. with taking 24 hours. The moisture produced during the above reaction was continuously removed from the reaction system, and the reaction was ceased at the point when the temperature reached 210° C. to give an oily polyester.

Polyesters were obtained in the same manner as above except for combinations of any of polyhydric alcohols and any of polycarboxylic acids shown in Table 1 in lieu of the combination of ethylene glycol and oxalic acid.

As a comparative example, a polyester was prepared in the similar manner to the above except that pentanediol and phthalic acid were used instead of ethylene glycol and oxalic acid, respectively.

The obtained polyesters were oily and the weight average molecular weights thereof were within the range of 2,000 to 8,000.

The properties of the oily polyesters as retarders were evaluated in the following manner. That is, a polypropylene container having a caliber of 12 cm was charged with 600 g of a mortar containing Portland cement/sand/water=100/200/55 (by weight), and the surface of charged was smoothed. To the smoothed mortar was inserted and buried partially a polypropylene ring (caliber 5 cm, height 3 cm, thickness 0.3 mm) as the height being half. The oily polyester was poured into the ring as the height of the layer being 2 to 3 mm within 10 minutes after the preparation of the mortar and hence the polyester was flowed and extended on the furnace of the mortar. The top of the polypropylene container was sealed with a wrapping film for food and the sealed container was allowed to stand for 1 hour.

Thereafter, the whole of the polypropylene container was transferred into an oven at 50° C. and was allowed to stand for 8 hours for curing. After the curing, the polypropylene container was taken out and allowed to stand for 55 hours at room temperature for the hardening of the mortar. The ring and remained oily polyester were removed from the hardened mortar, and the contact face of the oily polyester and mortar was washed with a tooth brush while washing with water. The washed product was air-dried and the washing quality was evaluated by visual observation according to the following criteria.

Further, a blank test was conducted where washing was carried out in the same manner as above except that the oily polyester was not used. In the blank test, the surface of the hardened mortar was dense and smooth. Furthermore, particle shape of the sand was scarcely observed, and the surface showed homogeneously a cement color over the whole thereof.

Excellent: Remarkable retardative effect, concave formation in a depth of 2 to 5 mm on the surface of the mortar, Fair: Particles of the sand exposed, clear difference being observed in roughness and color tone between the inner area and the outer area of the ring, Good: Difference of the color tone being apparently observed due to exposure of the sand in comparison with the blank test or the outer area of the ring, but there being little difference in the smoothness of the surfaces, the extent of the exposure of the sand particles being small, Poor: No difference from the blank test observed in the external appearance.

TABLE 1

|    | Oxalic acid | Succinic acid | Maleic acid | Fumaric acid | Adipic acid | Phthalic acid |
|----|-------------|---------------|-------------|--------------|-------------|---------------|
| EG | Fair        | Fair          | Excellent   | Fair         | Good        | Poor          |
| PG | Good        | Good          | Excellent   | Good         | Good        | Poor          |
| BD | Good        | Good          | Fair        | Good         | Poor        | Poor          |

TABLE 1-continued

|          | Oxalic acid | Succinic acid | Maleic acid | Fumaric acid | Adipic acid | Phthalic acid |
|----------|-------------|---------------|-------------|--------------|-------------|---------------|
| Glycerin | Good        | Good          | Fair        | Good         | Good        | Poor          |
| PD       | Poor        | Poor          | Good        | Poor         | Poor        | Poor          |

In the table, the symbols for the polyhydric alcohols mean as follows: EG: Ethylene glycol, PG: Propylene glycol, BD: 1,4-butanediol, PD: 1,5-pentanediol Example 2

A 10-liter autoclave provided with a stirring blade was charged with 3,452 g (35.2 moles) of maleic anhydride and 2,539 g (40.9 moles) of ethylene glycol, and to the charged were added 100 ppm of hydroquinone as a polymerization inhibitor and 50 ppm of tetra-n-butoxytitanium as a polymerization catalyst. The resultant charged was stirred and heated from ambient temperature to 150° C. with taking 3 hours, and heated from 150° C. up to 210° C. with taking 24 hours, under atmospheric pressure (ordinary pressure), while nitrogen gas being circulated for removing moisture produced with the reaction, and thereafter the reaction was ceased. The obtained unsaturated polyester was cooled to 80° C., and, to 100 parts by weight of the oily unsaturated polyester (weight average molecular weight 2,250) were added and mixed 3 parts by weight of an organic peroxide (Nippon Oil and Fats Co., Ltd., "PERBUTYL-O") and 50 ppm of cobalt acetate as a crosslinking catalyst. The resultant mixture was poured into a stainless steel bat (25 cm×40 cm×5 cm) as the height being 2 cm, and heated in a furnace at 120° C. for 15 minutes to be cured.

The cured product was cooled to room temperature, roughly pulverized with a crusher, and further pulverized into particles having a mean particle size of 200 μm or less by means of a refrigerating grinder to give a powdery cement retarder.

This powdery cement retarder was scattered homogeneously over the whole of a tacky adhesive-coated side of a 5 cm-width tape coated with a tacky adhesive (Nichiban Co., Ltd., Strong Adhesive Type for Corrugated Cardboard Packing), and excessive powder was removed aside. The obtained tape was applied to the bottom of a wood form for concrete slab (inner volume 1 m×1 m×(depth) 10 cm) at intervals of 10 cm as the power-adhered side being upside.

In the form was placed a mortar composed of Portland cement/sand/water=100/200/55 (by weight) as the height of the placed mortar being 3 cm, and reinforcing steel bars (diameter 1 cm×80 cm) were arranged in the form at intervals of 20 cm, and the mortar was further placed so as the total height of the placed mortar being 6 cm. The resultant was allowed to stand at ambient temperature (room temperature) for 168 hours, and the hardened molded plate was removed from the form, the tacky adhesive tape was eliminated, and the washing was conducted by washing by means of a scrubbing brush while washing with water. As a result, only the contact part in contact with the tape was washed out in a depth of 2 to 3 cm, and washing surfaces of 5 cm in width having a natural color of sand and a coarse surface due to the sand particle were clearly formed at intervals of 10 cm.

Example 3

A polymerizable composition was prepared by adding and mixing 10 parts by weight of 2-hydroxyethyl methacrylate, 3 parts by weight of an organic oxide (Nippon Oil and Fats Co., Ltd., "PERBUTYL-O") and 50 ppm in concentration of cobalt acetate as a crosslinking catalyst to 100 parts by weight of an oily unsaturated polyester as prepared in the same manner as Example 2. The polymerizable composition was applied to a 50-$\mu$m thickness polyethylene terephthalate sheet in a coating amount of 50 g/m$^2$, and the coated sheet was passed through an oven at 150° C. for 30 seconds for heating to be cured, and thereby a cement retardative sheet was obtained. This sheet was slitted to provide lengthy sheets each having a width of 5 cm.

These lengthy sheets were applied, in a lattice form at intervals of 10 cm, to an internal wall (inner wall of 1 m×1 m) of a concrete form (30 cm×1 m×(depth) 1 m) as the coated surface being in the face to the internal side of the form. To the form was placed the same mortar as Example 2 and was hardened for 168 hours, and the hardened mortar was removed from the form.

By washing the surface of the hardened mortar in the same manner as Example 2, the contact portion in contact with the cement retardative sheet was washing-finished in a depth of about 2 mm to form a distinct cross-cut (lattice) pattern.

Example 4

A viscous oily unsaturated polyester (weight average molecular weight 1,950) was prepared in the same manner as Example 2, except for using 3,603 g (31.1 moles) of maleic anhydride and 2,674 g (29.1 moles) of glycerin. To 100 parts by weight of the unsaturated polyester was added 10 parts by weight of butyl acrylate, and to 100 parts by weight of the total amount of the both components was added 3 parts by weight of an organic peroxide (Nippon Oil and Fats Co., Ltd., "PERBUTYL-O"), and these components were mixed at 50° C. to prepare a solution of a polymerizable composition.

This polymerizable composition was impregnated to a polyester nonwoven fabric having a weight (Metsuke) of 30 g/m$^2$, and excess composition was removed by squeezing the nonwoven fabric with a roll. The impregnated nonwoven fabric was heated in an oven at 150° C. for 30 seconds to give a cement retardative sheet.

The retardative sheet was spread all over the bottom of the wood form used in Example 2, square tiles (10 cm×10 cm×(thickness) 8 cm) and joint rods (square form with cross section of 10 mm×10 mm) were arranged reciprocally on the sheet and the mortar used in Example 2 was deposited thereto. The mortar was allowed to stand at ambient temperature for 168 hours for hardening, and the resultant concrete molded article was removed from the form, and the surfaces of the tiles were washed with water. As a result, attachment on the surfaces of the tiles were smoothly removed only by means of washing with water, and removing work with the use of a wire brush or a spatula was not required.

Example 5

The process of Example 2 was repeated except for using 3,450 g (35.2 moles) of maleic anhydride and 2,800 g (45.2 moles) of ethylene glycol to give an oily unsaturated polyester (weight average molecular weight 540). The unsaturated polyester was applied with a brush at intervals of 10 cm and in a width of 10 cm to the bottom of the wood form used in Example 2. The mortar as employed in Example 2 was deposited in the form at a height of 5 cm, reinforcing steels used in Example 2 were arranged at intervals of 20 cm in the form and the mortar was further deposited so as the total height of the mortar to be 10 cm. The mortar was hardened in the same manner as Example 2 and the hardened concrete molded article was removed from the form and was washed out. Hence, only in the applied portion of the oily unsaturated polyester, the sand and cement were washed out in a depth of about 2 mm. In the washed portion after drying was formed a scabrous surface with a shallow grave, which scabrous surface had a natural color of sand, and had sand particles exposed to the surface. The uncoated part to which the unsaturated polyester had not been coated was hardened, and the retardative effect of the unsaturated polyester did not reach there.

Example 6

An oily saturated polyester (weight average molecular weight 490) was prepared in the same manner as Example 5 except that 4,090 g (34.6 moles) of succinic acid and 2,770 g (44.6 moles) of ethylene glycol were employed. By using the obtained saturated polyester, the cement retardative property was evaluated in the same manner as Example 5, and as a result, only the part applied with the oily saturated polyester was washed to form a comparatively smooth washing-finished surface having a natural color of sand.

Example 7

A polymer was obtained by conducting a reaction in the same manner as Example 5 except for employing 3,430 g (35.0 moles) of maleic anhydride and 2,387 g (38.5 moles) of ethylene glycol, continuing the reaction for further 13 hours after the reaction temperature reached 210° C., and ceasing the reaction at the point when stirring became impossible. This polymer was glassy at room temperature and insoluble in a solvent so that the molecular weight of the polymer could not be determined by gel permeation chromatography. The polymer was pulverized with a crusher and a refrigerating pulverizer using a liquid nitrogen to give powder having a mean particle size of not greater than 200 $\mu$m.

The retardative property was evaluated in the same manner as Example 2, except that the powder was scattered to a tape coated with a tacky adhesive, and as a result, only the part in contact with the tape was washed in a depth of about 2 mm to form distinct washing-finished surfaces with a width of 5 cm at intervals of 10 cm.

Examples 8 to 10 and Comparative Example 2

Unsaturated polyesters were obtained in the same manner as Example 2, except for using the polycarboxylic acid components and polyhydric alcohol components shown in Table 2. The weight average molecular weights of the obtained unsaturated polyesters were also shown in Table 2.

TABLE 2

|  | Ex. 8 | Ex. 9 | Ex. 10 | Comp. Ex. 2 |
|---|---|---|---|---|
| Maleic anhydride (g) | 3312 | 3136 | 2460 | 1676 |
| (mole) | 33.8 | 32.0 | 25.1 | 17.1 |
| Terephthalic acid (g) | 232 | 531 | 1677 | 3005 |
| (mole) | 1.4 | 3.2 | 10.1 | 18.1 |
| (%)* | 5 | 10 | 30 | 50 |
| Ethylene glycol (g) | 2538 | 2538 | 2538 | 2538 |
| (mole) | 40.9 | 40.9 | 40.9 | 40.9 |

TABLE 2-continued

|  | Ex. 8 | Ex. 9 | Ex. 10 | Comp. Ex. 2 |
| --- | --- | --- | --- | --- |
| Weight average molecular weight | 2200 | 2120 | 1940 | 1810 |

*Weight % of terephthalic acid residue in the polymer

To 100 parts by weight of the unsaturated polyester were added 3 parts by weight of an organic peroxide (Nippon Oil and Fats Co., Ltd., "PERBUTYL-O") and 50 ppm in concentration of cobalt acetate as a crosslinking catalyst to give a polymerizable composition. The polymerizable composition was applied in an amount of 50 g/m$^2$ to a 50 μm-thickness polyethylene terephthalate sheet, and the coated sheet was passed through an oven at 150° C. to heat for 30 seconds for hardening, and thereby a coated sheet was obtained.

Water Immersion Test

The coated sheet was cut into a size of 5 cm×10 cm to provide a test sample. The test sample was immersed in a pure water for 5 seconds and pulled up from the water. The immersed test sample was allowed to stand on a filter paper as the coated surface of the unsaturated polyester being upside, and change of the test sample was observed over 10 minutes to give the following results.

Example 8: The coated sheet was curled strongly, but wrinkles were slight and the coated layer of the unsaturated polyester did not peel.

Example 9: The coated sheet was curled, but the coated surface of the unsaturated polyester did not change and neither wrinkle nor peeling was observed.

Example 10: The coated sheet was curled slightly but no remarkable change was observed.

Comparative Example 2: The coated sheet scarcely changed.

Washing Finish Test

The coated sheet was slitted into a width of 5 cm to give lengthy sheets. The lengthy sheets were applied, as the coated surface being upside, to the bottom of a wood form (1 m×1 m×(depth) 10 cm) at intervals of 10 cm, the mortar used in Example 2 was deposited at a height of 3 cm, and thereto reinforcing steels (diameter 1 cm×80 cm) were arranged at intervals of 20 cm and the mortar was furher deposited at the total height of 6 cm. The resultant was allowed to stand at ambient temperature for 168 hours, and the hardened molded plate was removed from the form, the lengthy sheets were eliminated and washing finish was conducted with a scrub brush while washing with water. The results are as follows.

Example 8: A concave with a depth of about 2 mm was formed in the part in contact with the sample sheet, and hence excellent washing finish quality was observed.

Example 9: A concave with a depth of about 2 mm was formed in the part in contact with the sample sheet, and hence excellent washing finish quality was observed.

Example 10: A concave with a depth of about 1 mm was formed in the part in contact with the sample sheet, and fair washing finish quality was observed, but the depth of the concave was shallow in comparison with Examples 8 and 9.

Comparative Example 2: Change of hue was observed in the part in contact with the sample sheet, but there was no change in the surface roughness in comparison with the non-contacted part with respect to the sample sheet.

Example 11

A polymerizable composition was prepared by adding and mixing 10 parts by weight of styrene, 3 parts by weight of an organic peroxide (Nippon Oil and Fats Co., Ltd., "PERBUTYL-O") and 50 ppm in concentration of cobalt acetate as a crosslinking catalyst to 100 parts by weight of the unsaturated polyester obtained in Example 8 (terephthalic acid content 5% by weight). A coated sheet holding a cured product of the unsaturated polyester was manufactured in the same manner as Example 8 except for employing the above polymerizable composition, and the resultant sheet was subjected to the water immersing test and the washing finish test in the same manner as Example 8.

As a result, the sample sheet showed no noticeable curl and the unsaturated polyester-coating surface exhibited no change in the water immersing test. In the washing finish test, a washing finish surface of about 2 mm depth was formed in the contact part with the lengthy sheet.

Comparative Example 3

One side of a 50 μm-thickness poly(ethylene terephthalate) sheet was subjected to corona discharge treatment, and to the corona discharge-treated side of the sheet was coated with an acrylic tacky adhesive on a solid matter basis of 39 g/m$^2$ in a gravure role method, and the coated sheet was dried to give a tacky adhesive sheet formed with a tacky adhesive layer.

Comparative Example 4

A tacky adhesive sheet was obtained in the same manner as Comparative Example 3, except for applying the acrylic tacky adhesive in an amount of 247 g/m$^2$ on a solid matter basis.

Example 12

The procedure of Comparative Example 3 was repeated to give a tacky adhesive sheet except for coating the sheet with a tacky adhesive composition comprising 72% by weight (solid matter) of an acrylic tacky adhesive and 28% by weight of a concrete retardative composition in a proportion of 217 g/m$^2$ on a solid matter basis.

The concrete retardative composition is a mixed composition as produced by adding 0.1 part by weight of cobalt naphthenate and 1 part by weight of t-butyl peroxybenzoate to a mixture comprising 50 parts by weight of an unsaturated polyester resin with a weight average molecular weight of 3,000, 35 parts by weight of hydroxyethyl methacrylate and 10 parts by weight of calcium carbonate, which unsaturated polyester resin had been obtained by reacting polyethylene glycol (molecular weight 300)/propylene glycol/ethylene glycol/maleic anhydride=1/1/1/3 (by mole).

Example 13

A tacky adhesive sheet was obtained in the same manner as Comparative Example 3 except for using the tacky adhesive composition prepared in Example 12 in an amount of 246 g/m$^2$ on solid matter basis.

Example 14

By using the tacky adhesive composition prepared in Example 12 in a proportion of, on solid mater basis, 100 g/m², a tacky adhesive sheet was provided in the same manner as Comparative Example 3.

Example 15

The procedure of Comparative Example 3 was repeated to give a tacky adhesive sheet, except for applying a tacky adhesive composition comprising 52% by weight of an acrylic tacky adhesive (on solid matter basis) and 48% by weight of the concrete retardative composition of Example 13 in an amount of 50 g/m² on solid matter basis.

Example 16

A tacky adhesive sheet was provided in the similar manner as Comparative Example 3, except for applying the tacky adhesive composition prepared in Example 15 in an amount of 110 g/m² on solid matter basis.

Example 17

The procedure of Comparative Example 3 was repeated to give a tacky adhesive sheet, except for using 200 g/m² (solid matter basis) of the tacky adhesive composition prepared in Example 15.

To the surfaces of the tacky adhesive layers of the tacky adhesive sheets (50 cm×50 cm) each obtained in Comparative Examples 3 and 4 and Examples 12 to 17 were allowed to touch the surfaces of tiles (about 15 cm×15 cm), and the tiles were adhered as arranged 3 tiles in longitudinal direction and transverse direction respectively (total 9 tiles/sheet) in the plane direction to prepare unit tiles.

Each unit tile was disposed on the bottom of a form for concrete placing (50 cm×50 cm×50 cm), a concrete was placed into the form and was cured, the hardened concrete was removed from the form, and the tacky adhesive sheet was eliminated, and a precast concrete slab was obtained by washing-finish of the exposed surfaces of the tiles with water.

To the precast concrete slabs each obtained in Comparative Examples 3 and 4, cement which had reached the surfaces of the tiles was hardened and hence firmly adhered to the surface. Therefore, mechanical surface finishing step was required to remove the hardened cement which had not been eliminated by washing with water. To the contrary, in the precast concrete slabs each prepared by using the tacky adhesive sheets each obtained in Example 12 to 17, the cement reached the surfaces of the tiles was not completely hardened after completion of curing, and the cement adhered to the surfaces of the tiles could be removed only by means of washing with water, and hence surface finish could easily be conducted with inhibiting damage of the tiles. Incidentally, the adhesive properties between the tacky adhesive layers and the tiles in the unit tiles (that is, holding qualities of the tacky adhesive layers with respect to the tiles) each obtained with the use of the tacky adhesive sheets obtained in Comparative Examples 3 and 4, and examples 12 to 17 were fair.

What is claimed is:

1. A cement retarder which comprises a saturated polyester comprising a polycarboxylic acid component comprising a polycarboxylic acid having 2 to 6 carbon atoms in the main chain or its derivative, and a polyol component containing a polyhydric alcohol having 2 to 4 carbon atoms or its condensate.

2. A cement retarder as claimed in claim 1, wherein said polycarboxylic acid is a saturated dicarboxylic acid having 2 to 5 carbon atoms in the main chain.

3. A cement retarder as claimed in claim 1, wherein the main repeating unit of the saturated polyester comprises a repeating unit having 4 to 9 carbon atoms.

4. A cement retarder as claimed in claim 1, wherein said polycarboxylic acid component further contains an aromatic dicarboxylic acid or its derivative.

5. A cement retarder as claimed in claim 4, wherein the content of the aromatic dicarboxylic acid is 0.1 to 30% by weight based on the total weight of the saturated polyester.

6. A cement retarder as claimed in claim 4, wherein said aromatic dicarboxylic acid is at least one species selected from the group consisting of phthalic acid, terephthalic acid, isophthalic acid and derivatives of these acids.

7. A cement retarder as claimed in claim 1, wherein said polyhydric alcohol is at least one species selected from the group consisting of ethylene glycol, propylene glycol, trimethylene glycol, tetramethylene glycol, dioxyethylene glycol, trioxyethylene glycol, polyoxyethylene glycol, dioxypropylene glycol, trioxypropylene glycol, polyoxypropylene glycol and glycerin.

8. A cement retarder as claimed in claim 1, wherein the saturated polyester has a weight average molecular weight of 300 to 100,000.

9. A cement retarder as claimed in claim 1, wherein the saturated polyester has a weight average molecular weight of 300 to 5,000.

10. A method for inhibiting hardening of cement which comprises using the cement retarder according to claim 1.

11. A cement retarder which comprises a saturated polyester comprising a dicarboxylic acid component comprising a saturated aliphatic dicarboxylic acid having 2 to 6 carbon atoms or its derivative in the main chain, and a diol component comprising a diol having 2 to 4 carbon atoms or its condensate, and said polyester having a repeating unit containing 4 to 9 carbon atoms as a main repeating unit.

12. A cement retarder as claimed in claim 11, wherein said polyester is a saturated polyester comprising a dicarboxylic acid component comprising a saturated aliphatic dicarboxylic acid having 2 to 6 carbon atoms in the main chain or its derivative, and at least one aromatic dicarboxylic acid selected from the group consisting of phthalic acid, terephthalic acid, isophthalic acid and derivatives thereof, and a diol component comprising a diol having 2 to 4 carbon atoms or its condensate.

13. A cement retardative sheet which comprises a base sheet and a retardative layer formed on a surface of said base sheet, which retardative layer comprises the cement retarder as claimed in claim 1 or 11, and a tacky adhesive or an adhesive.

14. A decorative material kit sheet which is produced by applying plural decorative material continuously or as scattered on a retardative layer having tacky adhesive property or adhesive property in the cement retardative sheet of claim 13.

15. A method for producing a dress finished concrete product, which method comprises the steps of arranging the decorative material kit sheet of claim 14 in a form, depositing an inorganic hardenable composition into the form and hardening the composition, removing the resultant hardened composition from the form, eliminating the sheet having tacky adhesive property or adhesive property, and washing the surface of the exposed decorative material.

16. A dress finished concrete product produced by the method according to claim 15.

17. A method for decorating the surface of an inorganic hardenable composition which comprises using the decorative material kit according to claim 14.

18. A cement retardative sheet which comprises a base sheet and a composition held or supported by the base sheet, which said composition comprises a cement retarder composed of a saturated polyester comprising a polycarboxylic acid component comprising a polycarboxylic acid having 2 to 6 carbon atoms in the main chain or its derivative, and a polyol component containing a polyhydric alcohol having 2 to 4 carbon atoms or its condensate.

19. A cement retardative sheet as claimed in claim 18, wherein said sheet is obtainable by applying or impregnating a composition comprising the saturated polyester to a non-porous sheet or a porous sheet.

* * * * *